United States Patent
Schlee

(10) Patent No.: US 8,731,005 B2
(45) Date of Patent: May 20, 2014

(54) ABSOLUTE TIMING AND TX POWER CALIBRATION OF THE TX PATH IN A DISTRIBUTED SYSTEM

(75) Inventor: Johannes Schlee, Ulm (DE)

(73) Assignee: Kathrein-Werke KG, Rosenheim (DE)

(*) Notice: Subject to any disclaimer, the term of this patent is extended or adjusted under 35 U.S.C. 154(b) by 713 days.

(21) Appl. No.: 12/577,339

(22) Filed: Oct. 12, 2009

(65) Prior Publication Data

US 2011/0085490 A1    Apr. 14, 2011

(51) Int. Cl.
*H04J 3/06* (2006.01)
(52) U.S. Cl.
USPC ........ 370/516; 370/380; 370/381; 455/250.1; 455/575.8
(58) Field of Classification Search
USPC .............. 370/380–381; 455/78, 115.1, 115.2, 455/550.1, 575.1, 67.11, 67.13, 114.2; 375/67, 135, 146, 221, 295, 260
See application file for complete search history.

(56) References Cited

U.S. PATENT DOCUMENTS

| 5,852,630 | A | 12/1998 | Langberg et al. |
|---|---|---|---|
| 6,157,343 | A | 12/2000 | Andersson et al. |
| 6,292,135 | B1 | 9/2001 | Takatori et al. |
| 6,510,191 | B2 | 1/2003 | Bockelman |
| 6,693,588 | B1 | 2/2004 | Schlee |
| 6,823,001 | B1 | 11/2004 | Chea |
| 6,944,188 | B2 | 9/2005 | Sinha et al. |
| 7,136,444 | B2 * | 11/2006 | Christensen et al. ......... 375/373 |
| 7,194,021 | B2 | 3/2007 | Darbel et al. |
| 7,483,450 | B1 | 1/2009 | Giese et al. |
| 7,558,348 | B1 | 7/2009 | Liu et al. |
| 7,580,686 | B2 | 8/2009 | Fonden et al. |
| 2002/0097085 | A1 | 7/2002 | Stapleton |
| 2002/0110211 | A1 * | 8/2002 | Bockelman ................... 375/371 |
| 2003/0164961 | A1 | 9/2003 | Daly |
| 2003/0236107 | A1 | 12/2003 | Azuma |
| 2004/0105509 | A1 | 6/2004 | McGowan et al. |

(Continued)

FOREIGN PATENT DOCUMENTS

| EP | 1389837 | 2/2004 |
|---|---|---|
| EP | 1649618 | 2/2005 |

(Continued)

OTHER PUBLICATIONS

International Search Report issued in PCT/EP10/53707 on Jun. 14, 2010.

(Continued)

*Primary Examiner* — Kibrom T Hailu
*Assistant Examiner* — Zewdu A Beyen
(74) *Attorney, Agent, or Firm* — Stephen H. Eland; Dann, Dorfman, Herrell & Skillman

(57) ABSTRACT

A radio system and a method for relaying packetized radio signals is disclosed. The radio system and the method provide a calibration of transmit signals. Furthermore the radio system and the method provide a measurement of a transmit power level. The radio system comprises at least one transmit path, a calibration unit, a base band calibration signal generator synchronized to a synchronization unit, at the least one link and a power sensor. A portion of a selected one of coupled transmit signals is forwarded to a power sensor for measuring a power level, wherein the calibration unit is adapted to update a transmit power level of the at least one transmit path in response to the transmit power level of the selected one of the coupled transmit signals.

25 Claims, 11 Drawing Sheets

(56) References Cited

U.S. PATENT DOCUMENTS

| | | |
|---|---|---|
| 2004/0151506 A1 | 8/2004 | Shiramizu et al. |
| 2004/0204098 A1* | 10/2004 | Owen .......................... 455/561 |
| 2004/0246048 A1 | 12/2004 | Leyonhjelm et al. |
| 2005/0047495 A1 | 3/2005 | Yoshioka |
| 2005/0110565 A1 | 5/2005 | Robinson |
| 2005/0111575 A1* | 5/2005 | Taler et al. .................... 375/297 |
| 2005/0282506 A1* | 12/2005 | Azuma ...................... 455/115.1 |
| 2006/0105715 A1 | 5/2006 | Kodani et al. |
| 2006/0133535 A1 | 6/2006 | Jung et al. |
| 2006/0286940 A1 | 12/2006 | Izumi et al. |
| 2008/0095266 A1 | 4/2008 | Rashev et al. |
| 2008/0143562 A1 | 6/2008 | Huang et al. |
| 2008/0219331 A1 | 9/2008 | Liang et al. |
| 2008/0232492 A1 | 9/2008 | Xiao et al. |
| 2008/0309405 A1 | 12/2008 | Young et al. |
| 2009/0034651 A1 | 2/2009 | Lan et al. |
| 2009/0207940 A1 | 8/2009 | Staszewski et al. |
| 2010/0087227 A1 | 4/2010 | Francos et al. |
| 2010/0093282 A1 | 4/2010 | Martikkala et al. |
| 2010/0166109 A1 | 7/2010 | Neumann et al. |
| 2010/0166110 A1 | 7/2010 | Neumann et al. |
| 2011/0051847 A1 | 3/2011 | Flury et al. |
| 2012/0020392 A1 | 1/2012 | O'Keeffe et al. |
| 2012/0027066 A1 | 2/2012 | O'Keeffe |

FOREIGN PATENT DOCUMENTS

| | | |
|---|---|---|
| EP | 1608082 | 12/2005 |
| EP | 1120858 | 4/2007 |
| EP | 2204903 | 7/2010 |
| JP | 1020050089853 | 9/2005 |
| WO | 96/15585 | 5/1996 |
| WO | 03/019773 | 3/2003 |
| WO | 2005/011161 | 2/2005 |
| WO | 2010/038227 | 4/2010 |

OTHER PUBLICATIONS

International Search Report issued in PCT/EP10/53703 on Nov. 11, 2010.

International Search Report issued in PCT/EP10/53694 on Nov. 11, 2010.

International Search Report issued in PCT/EP10/53713 on Jul. 1, 2010.

International Preliminary Report issued in PCT/EDP2010/053694 on Oct. 4, 2011.

Examination Report issued in EP Application No. 10711373.0 on May 13, 2013.

Examination Report issued in EP Application No. 10710578.5 on May 13, 2013.

* cited by examiner

ABSOLUTE TIMING AND TX POWER CALIBRATION OF THE TX PATH IN A DISTRIBUTED SYSTEM

CROSS REFERENCE TO OTHER APPLICATIONS

The present application is related to U.S. patent application Ser. No. 12/416,630 entitled "RADIO SYSTEM AND METHOD FOR RELAYING RADIO SIGNALS WITH A POWER CALIBRATION OF TRANSMIT RADIO SIGNALS", filed on Apr. 1, 2009, U.S. patent application Ser. No. 12/416,639 entitled "A RADIO SYSTEM AND A METHOD FOR RELAYING RADIO SIGNALS", filed on Apr. 1, 2009, and U.S. patent application Ser. No. 12/416,626 entitled "A RADIO SYSTEM AND A METHOD FOR RELAYING PACKETIZED RADIO SIGNALS", filed on Apr. 1, 2009. The entire disclosure of each of the foregoing applications is incorporated herein by reference.

FIELD OF THE INVENTION

The field of the present invention relates to a radio system for relaying packetized radio signals. The field of the present invention further relates to a method for relaying packetized radio signals. Furthermore, the field of the present invention relates to a computer program product enabling a foundry to carry out the manufacture of the radio system for relaying packetized radio signals and a computer program product enabling a processor to carry out the method for relaying packetized radio signals.

BACKGROUND OF THE INVENTION

The use of mobile communications networks has increased over the last decade. Operators of mobile communications networks have increased the number of base stations in order to meet an increased request for service by users of the mobile communications network. The base stations typically comprise radio systems for relaying radio signals. The radio signals are typically relayed into and from a cell of the mobile communications network, and vice versa. It is of interest for the operator of the mobile communications network to reduce the running costs of the base stations. It is one option to implement the radio system as an antenna embedded radio system. With the antenna embedded radio system some of the hardware components of the radio system may be implemented on a chip. The antenna embedded radio system therefore reduces the costs of the base station. Implementing the radio system as the antenna embedded radio system reduces space needed to house the hardware components of the base station. Power consumption during normal operation of the radio system is substantially reduced when implementing the antenna embedded radio system comprising the chip.

It is of interest to provide a reliable quality of service to an individual user of the mobile communications network given the increase in the number of users. Several techniques have been suggested in order to deal with the increased number of users within the mobile communications network. One of the several techniques comprises beam forming capabilities in order to direct a beam relayed by the radio system in different directions to improve service coverage within the cells of the mobile communications network. The beam forming techniques rely on defined phase and amplitude relations between several of the antenna elements of the active antenna system. A transmit path and/or a receive path is associated with each antenna element. Calibration of the transmit paths and the receive paths is required to provide the defined phase and amplitude relationship between the beams. The calibration allows the estimation of a phase and amplitude deviation accumulated along the transmit path of the radio system. Likewise the calibration comprises estimating phase and amplitude deviations accumulated along the receive paths of the radio system. The calibration may further comprise a determination of transit times needed for a message signal to travel from a digital radio interface to the antenna element in order to be relayed. In a second step the phase and amplitude deviation accumulated along the transmit paths can be corrected. An appropriate phase and amplitude change may be applied to the individual transmit/receive paths to yield the defined phase and amplitude relationship between the individual transmit/receive paths of the radio system, in order to allow for beam forming techniques.

In a modern mobile communications network a payload signal is provided as a packetized payload signal to the radio system. Packets of the packetized payload signal have a defined temporal order when the packetized payload signal is provided to the digital radio interface. Within the radio system some processing may be applied to the packetized payload signal. The processing typically comprises the packetized payload signal passing several buffers and phase locked loops (PLLs). With the data processing the defined temporal order of the packets may be deteriorated or even destroyed. In the prior art, with non-packetized signals, it was possible and common practise to calibrate transmit paths along which the non-packetized payload signal travels when being relayed by the radio station upon manufacture of the radio system. The relaying by the radio station comprises the data processing.

The present invention is combinable with a digital predistortion system as known in the art. A co-pending application of the applicant U.S. Ser. No. 12/416,596 discloses the calibration of phase and amplitude changes and the updating of a digital predistortion in the case of non-packetized internal radio signals. The teachings of U.S. Ser. No. 12/416,596 are incorporated herein by reference. A further co-pending application of the applicant U.S. Ser. No. 12/416,626 discloses the calibration of phase and amplitude changes and the updating of a digital predistortion in the case of a packetized internal radio signals.

Radio systems are critical to a transit time from a radio signal reaching the digital radio interface until a corresponding radio signal is relayed by antenna elements of the radio system. The transit time is affected by any change in cable length and the like.

In the prior art it was necessary to recalibrate the radio system whenever a component of the radio system, for example, a cable, was replaced. Furthermore there was only very little flexibility with respect to a spatial arrangement of the transmit paths and/or the antenna elements of the prior art radio system. The recalibration in the prior art is expensive and time consuming.

U.S. Pat. No. 6,693,588 B1 (assigned to Siemens) discloses an electronically phase-controlled group antenna. The electronically phase-controlled group antenna is calibrated using a reference point shared by all the reference signals. In the downlink, reference signals which can be distinguished from one another are simultaneously transmitted by individual antenna elements of the group antenna and are suitably separated after reception at the shared reference point.

The Siemens system requires a fixed spatial arrangement of the antenna elements.

SUMMARY OF THE INVENTION

A radio system for relaying packetized radio signals comprises a base band calibration signal generator, a calibration unit, at least one link, at least one transmit path, a feedback path and a power sensor. The base band calibration signal generator is adapted for inserting a base band calibration signal into the packetized payload signal. The base band calibration signal is synchronised to a synchronisation unit. The calibration unit is adapted to split the packetized payload signal. By splitting the payload signal a calibrated payload signal is generated. The calibration unit is further adapted to apply at least one of phase, amplitude and delay changes to the at least one calibrated payload signal. The at least one of phase, amplitude and delay changes is to be construed as comprising at least one of a phase change, an amplitude change and a delay change. The at least one of phase, amplitude and delay changes may further be referred to as phase, amplitude and delay changes. The at least one transmit path is adapted to forward a packetized payload signal as a transmit signal. The feedback path is provided for feeding back a feedback signal. The feedback signal is adapted to update the phase and amplitude changes.

The at least one of phase, amplitude and delay changes are adaptable using correlations of at least two of the packetized payload signal, the base band calibration signal and the feedback signal. It is to be understood that the usage of correlations, i.e. the use of correlating methods, comprises correlating signals in substantially identical frequency ranges. It is convenient to carry out the correlation in the base band of the radio system. Without any limitation it is possible to carry out the correlations at an intermediate frequency. The intermediate frequency may be any frequency between the base band of the radio system and a band of transmission of the radio system.

The radio system as described herein enables an increased flexibility regarding a spatial arrangement of the transmit paths. Any change in the properties of the links can be corrected for by the radio system during normal operation. The speed of the at least one of the phase, amplitude and delay changes is increased.

The radio system also provides a measurement of the transmit power level of a portion of the selected one of the transmit paths. Therefore an absolute and a relative calibration of the transmit power levels of the transmit paths is possible with the radio station.

The radio system is adapted to ascertain the temporal order of the packetized payload signal even with several steps of digital data processing applied to the packetized payload signal.

It is to be understood that the radio system provides a measurement of a transit time needed for the packetized payload signal reaching the radio system until a corresponding transmit signal is being relayed by the radio system. The corresponding transmit signal represents the packetized payload signal that reached the radio system at the beginning of the transit time. The corresponding transmit signal comprises substantially all message content to a subscriber comprised in the packetized payload signal reaching the radio system.

The term "relaying" as used herein should be construed as comprising a transmitting as well as a receiving of radio signals. The receiving of the radio signals is commonly referred to as Rx. The transmitting of the radio signals is commonly referred to as Tx.

The present disclosure also discloses a method for relaying packetized radio signals. The method comprises providing a packetized payload signal, generating a base band calibration signal and generating a calibrated payload signal. The base band calibration signal is adapted to be inserted into the packetized payload signal. The base band calibration signal is synchronised to a synchronisation unit. The method further comprises forwarding the calibrated payload signal as a transmit signal. According to the method a feedback signal is fed back into a feedback path. The method further comprises power measuring a power level of a portion of a selected one of coupled transmit signals. The method further comprises updating the at least one of phase, amplitude and delay changes in response to the feedback signal.

A computer program product for a manufacture of the radio system is also disclosed.

The present disclosure also teaches a computer program product for carrying out the method.

DETAILED DESCRIPTION OF THE INVENTION

The invention will now be described on the basis of the drawings. It will be understood that the embodiments and aspects described herein are only examples and do not limit the protective scope of the claims in any way. The invention is defined by the claims and their equivalents. It will also be understood that features of one aspect can be combined with a feature of a different aspect.

Figure 1A:
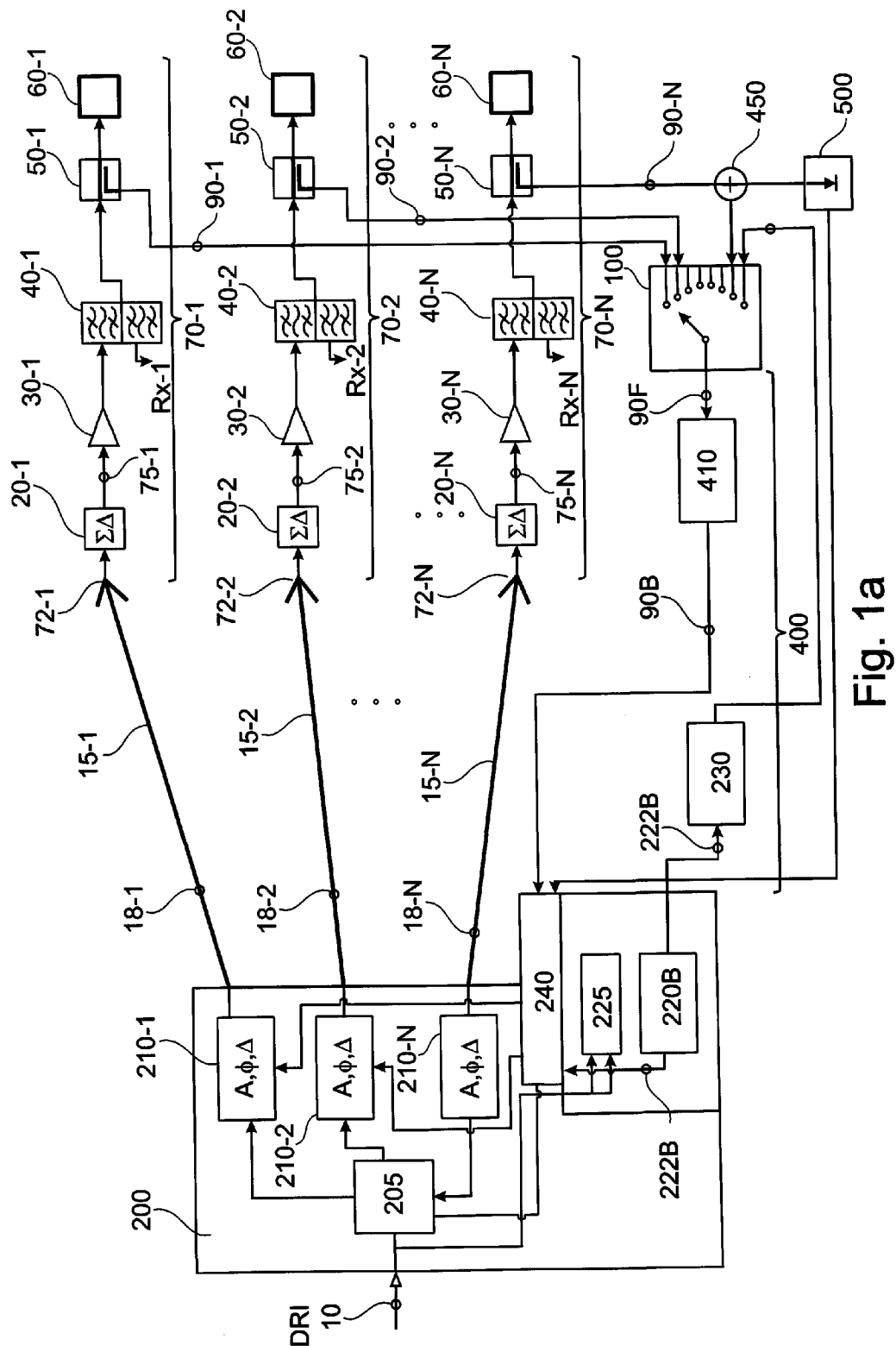
FIG. 1a shows a radio system.

FIG. 1a shows a radio system 1. A packetized payload signal 10 is forwarded to the radio system 1. Typically the packetized payload signal 10 is provided in a format comprising an in phase component I and a quadrature phase component Q. The packetized payload signal 10 is forwarded to a digital radio interface (DRI). The digital radio interface may be implemented in one non-limiting example according to the open base station architecture initiative standard (OBSAI). The packetized payload signal 10 is typically provided in a base band frequency range. The packetized payload signal 10 may also be referred to as the payload signal 10 in short.

A calibration unit 200 is adapted to split the packetized payload signal 10 into at least one calibrated payload signal 18-1, 18-2, . . . , 18-N. A pre-condition unit 205 transforms the packetized payload signal 10 onto a multi carrier signal, as is commonly used in mobile telecommunications. The calibration unit 200 applies phase, amplitude and delay changes 210-1, 210-2, . . . , 210-N to the calibrated payload signal 18-1, 18-2, . . . , 18-N leaving the pre-condition unit 205. The calibrated payload signal 18-1, 18-2, . . . , 18-N is forwarded along at least one link 15-1, 15-2, . . . , 15-N. The links 15-1, 15-2, . . . , 15-N are adapted to forward the calibrated payload signals 18-1, 18-2, . . . , 18-N to the transmit paths 70-1, 70-2, . . . , 70-N of the radio system 1. The transmit paths 70-1, 70-2, . . . , 70-N comprise an entry port 72-1, 72-2, . . . , 72-N. The transmit paths 70-1, 70-2, . . . , 70-N receive the calibrated payload signals 18-1, 18-2, ..., 18-N at the entry ports 72-1, 72-2, ..., 72-N. Within FIG. 1a there are only three of the transmit paths 70-1, 70-2, ..., 70-N shown. Obviously any other number of transmit paths 70-1, 70-2, ..., 70-N is conceivable. The links 15-1, 15-2, ..., 15-N may be flexible, and of different length. The links 15-1, 15-2, ..., 15-N may be implemented as serial links. It is to be understood that the links 15-1, 15-2, ..., 15-N carry the calibrated payload signal 18-1, 18-2, ..., 18-N in a digital domain. The links 15-1, 15-2, ... 15-N introduce variable delays to the payload signal 18-1, 18-2, ..., 18-N carried along the links 15-1, 15-2, ..., 15-N. The variable delay will be caused by a buffering (not shown) of the calibrated payload signal 18-1, 18-2, ..., 18-N along the links 15-1, 15-2, ..., 15-N. The links 15-1, 15-2, ..., 15-N may apply individual ones of phase, amplitude and delay deviations to the calibrated payload signals 18-1, 18-2, ..., 18-N. It is convenient to provide the calibrated payload signal 18-1, 18-2, ..., 18-N and the packetized payload signal 10 in the base band of the radio system 1. It is to be noted that the packetized payload signal 10 and the calibrated payload signal 18-1, 18-2, ..., 18-N may be without any limitation be provided at an intermediate frequency band IF (not shown). The intermediate frequency band IF may be any frequency band between the base band frequency of the radio system 1 and a frequency of transmission of the radio system 1. The links 15-1, 15-2, ..., 15-N provide spatial flexibility with respect to how the transmit paths 70-1, 70-2, ..., 70-N are arranged. The arrangement of the transmit paths 70-1, 70-2 ..., 70-N will be mostly governed by a spatial arrangement of antenna elements 60-1, 60-2, ..., 60-N terminating the transmit paths 70-1, 70-2, ..., 70-N, The links 15-1, 15-2, ..., 15-N will cause a variation in transit time needed for the calibrated payload signal 18-1, 18-2, ..., 18-N to travel from the calibration unit 200 to the entry reports 72-1, 72-2, ..., 72-N of the transmit paths 70-1, 70-2, ..., 70-N.

As is known in the art antenna elements 60-1, 60-2, ..., 60-N forming an (active) antenna array are sensitive to any change in transit times. Any change in the transit times will correspond to a transmit deviation 90T (see FIG. 2) accumulated along the transmit paths 70-1, 70-2, ..., 70-N. The transmit deviations 90T may comprise a transmit phase deviation, a transmit amplitude deviation and a transmit delay variation. Amplitude and phase components of the transmit deviations 90T need to be corrected in order to reach the defined phase and amplitude relation that is needed using the beam forming techniques. Transmit delays, i.e. transit times, need to be corrected for a proper relaying by the radio system with respect to communication protocols and/or location-based services. The location based services may be of interest when determining a position of the user, for example, using triangulation techniques. In other words the radio system needs to know how long a payload signal 10 takes from reaching the DRI until leaving the radio system 1 at one of the antenna elements 60-1, 60-2, ..., 60-N as a corresponding transmit signal.

It is to be understood that providing the links 15-1, 15-2, ..., 15-N enables the active antenna array formed by the antenna element 60-1, 60-2, ..., 60-N to be implemented as a distributed active antenna array. In other words the calibration unit 200 may be placed apart from the transmit paths 70-1, 70-2, ..., 70-N.

The antenna elements 60-1, 60-2, ..., 60-N may be transmit-only antenna elements. Alternatively or additionally, the antenna elements 60-1, 60-2, ..., 60-N may be transmit and receive antenna elements. Only the transmit paths 70-1, 70-2, ..., 70-N are shown in FIG. 1a. The radio system 1 may be combined with a receive system known in the art. The receive system is not shown in detail but will comprise receive paths Rx-1, Rx-2, ..., Rx-N.

The calibrated payload signal 18-1, 18-2, ..., 18-N reaching the entry port 72-1, 72-2, ..., 72-N of the transmit paths 70-1, 70-2, ..., 70-N is forwarded along the transmit paths 70-1, 70-2, ..., 70-N as transmit signal 75-1, 75-2, ..., 75-N.

The transmit signals 75-1, 75-2, ..., 75-N are digital to analogue converted using a digital to analogue converter 20-1, 20-2, ..., 20-N along the transmit paths 70-1, 70-2, ..., 70-N. The digital to analogue converter 20-1, 20-2, ..., 20-N may comprise a sigma delta digital to analogue converter, as shown in FIG. 1a. The sigma delta digital to analogue converters 20-1, 20-2, ..., 20-N do not require an up-converter (not shown) for up-converting and filtering the transmit signal 75-1, 75-2, ..., 75-N. An amplifier 30-1, 30-2, ..., 30-N is provided for amplifying the transmit signal 75-1, 75-2, ..., 75-N. A filter 40-1, 40-2, ..., 40-N is provided for separating the transmit paths 70-1, 70-2, ..., 70-N from the receive paths Rx-1, Rx-2, ..., Rx-N. The filter 40-1, 40-2, ..., 40-N may be implemented as a duplex filter as shown in FIGS. 1a-1d. The filters 40-1, 40-2, ..., 40-N are adapted to eliminate any signal components that are out of a frequency band of transmission of the radio system 1.

In order to allow for a calibration of the radio system 1, a portion of the transmit signals 75-1, 75-2, ..., 75-N is fed back to the calibration unit 200. The present disclosure teaches a coupler 50-1, 50-2, ..., 50-N to extract a portion of the transmit signal 75-1, 75-2 ..., 75-N as a coupled transmit signal 90-1, 90-2, ..., 90-N. The feedback of the coupled transmit signals 90-1, 90-2, ..., 90-N as a feedback signal 90F allows the determination of phase, amplitude and delay deviations accumulated between individual transmit signals 75-1, 75-2, ..., 75-N travelling along the transmit paths 70-1, 70-2, ..., 70-N.

It is conceivable that the couplers 50-1, 50-2, ..., 50-N couple not only to their respective antenna element 60-1, 60-2, ..., 60-N but additionally to a next neighbouring antenna element. Furthermore the couplers 50-1, 50-2, ..., 50-N may couple to RF signals received by the antenna elements 60-1, 60-2, ..., 60-N. Neither the RF signals received by the antenna element 60-1, 60-2, ..., 60-N nor the RF signals from next neighbouring antenna elements are of relevance for a calibration of the transmit paths 70-1, 70-2, ..., 70-N. It may be of interest to provide filtering elements (not shown) downstream of the couplers 50-1, 50-2, ..., 50-N. The filter elements (not shown) may be arranged between the couplers 50-1, 50-2, ..., 50-N and the switch 100. Alternatively and without any limitation the filtering elements (not shown) may also be provided downstream of the switch 100. An individual filtering element downstream of the switch 100 may need to incorporate all the filtering characteristics of the filtering elements disposed between the couplers 50-1, 50-2, ..., 50-N and the switch 100, when implementing the individual filtering element downstream of the switch 100.

As a further alternative any filtering capabilities needed may be incorporated within a feedback signal demodulator 410. The feedback signal demodulator 410 receives the feedback signal 90F from the switch 100. The feedback signal demodulator 410 is arranged in a feedback path 400. The feedback signal demodulator 410 receives the feedback signal 90F from the switch 100. The feedback signal demodulator 410 may be adapted to attenuate the feedback signal 90F if necessary. The feedback signal demodulator 410 is further adapted to analogue-to-digital convert the feedback signal 90F. It is to be understood that the feedback signal 90F comprises an analogue radio frequency signal. The feedback signal demodulator 410 may comprise a sigma delta converter for the analogue-to-digital converting. The feedback signal demodulator 410 could, instead, comprise a conventional analogue-to-digital converter; a down converter (not shown) is also needed, as is known in the art. The down converter (not shown) may comprise a filtering functionality. The feedback signal demodulator 410 generates a base band feedback signal 90B. It is to be understood that the base band feedback signal 90B comprises a digital, packetized signal. The base band feedback signal 90B is forwarded to a calibration update module 240. It will be appreciated by a person skilled in the art that demodulating the feedback signal 90F to the base band frequency yielding the base band feedback signal 90B is a matter of convenience only. One may alternatively modulate the feedback signal 90F to any intermediate frequency IF between the base band frequency and the frequency band of transmission of the radio station 1.

The present disclosure teaches a feedback path 400 that can be used for a calibration of the amplitude, phase and delay changes 210-1, 210-2, ..., 210-N. A calibration update unit 240 uses the feedback path 400, more precisely feedback signals 90F relayed along the feedback path 400, in order to update the phase, amplitude and phase changes 210-1, 210-2, ..., 210-N applied to the packetized payload signal 10 yielding the calibrated payload signal 18-1, 18-2, ..., 18-N.

A switch 100 is adapted to forward a selected one of the coupled transmit signals 90-1, 90-2, ..., 90-N as the feedback signal 90F into the feedback path 400. Without any limitation the switch 100 may be replaced by a combiner 110 as is, for example, shown in FIG. 1c. The choice of using the switch 100 or the combiner 110 is arbitrary and one of choice only.

The base band calibration signal generator 220B provides a base band calibration signal 222B that is applied to the packetized payload signal 10. The packetized payload signal 10 as forwarded to the radio system 1 at the digital radio interface DRI, comprises the well defined temporal order of the packetized payload signal 10. A synchronisation unit 225 extracts the well defined temporal order of the packetized payload signal 10 thereby obtaining a clocking signal from the packetized payload signal 10. The clocking signal may, for example, be derived, from rising edges of a train of data packages in the packetized payload signal 10. The base band calibration signal generator 220B is synchronised by the clocking signal provided by the synchronisation module 225. Therefore the base band calibration signal 222B is synchronised to the packetized payload signal 10 arriving at the digital radio interface DRI of the radio station 1. The base band calibration signal 222B is forwarded to a calibration signal modulator 230. The calibration signal modulator 230 is adapted to transform the base band calibration signal 222B into a calibration signal 222 within the frequency range of the transmission of the radio system 1. The calibration signal 222 is forwarded to an entry of the switch 100.

It will be appreciated that the base band calibration signal 222B is only required for the calibration of the phase, amplitude and delay changes 210-1, 210-2, ..., 210-N in the case of packetized payload signal 10.

It is to be noted that the switch 100 provides N+1 inputs and a single output. It is possible to use the base band calibration signal 222B and/or the calibration signal 222 for calibrating the feedback path 400 with the radio system 1 as shown in FIG. 1a. The switch 100 should be switched to the entry connected to the calibration signal 222 in order for the calibration update module 240 to produce a calibration of feedback deviations accumulated along the feedback path 400. More precisely a calibration is possible for signals accumulating feedback deviations between the base band calibration signal generator 220B, the calibration signal modulator 230, the switch 100, the feedback signal demodulator 410; reaching the calibration update module 240 with the switch 100 switched to the entry connected to the calibration signal 222. It is to be understood that the base band calibration signal 222B is in the analogue domain. The baseband calibration signal 222B travels from the base band calibration signal generator 220B to the switch 100 and reaches the calibration signal demodulator 410. Therefore timing information, i.e. transit times, can be derived in a usual manner, as is known in the art. The derivation of the timing information is not as straight forward for the base band calibration signal 90B travelling from the calibration signal demodulator 410 to the calibration update module 240. The base band calibration signal 90B is in the digital domain and therefore the timing information will be variable due to buffering along the digital signal path, as discussed with respect to the links 15-1, 15-2, ..., 15-N. Typically, the timing information for the base band calibration signal 90B will be constant, once the digital signal path from the calibration signal demodulator 410 to the calibration update module 240 is established. The timing information will typically vary upon a reset of the digital signal path, as is known in the art.

Figure 1B:
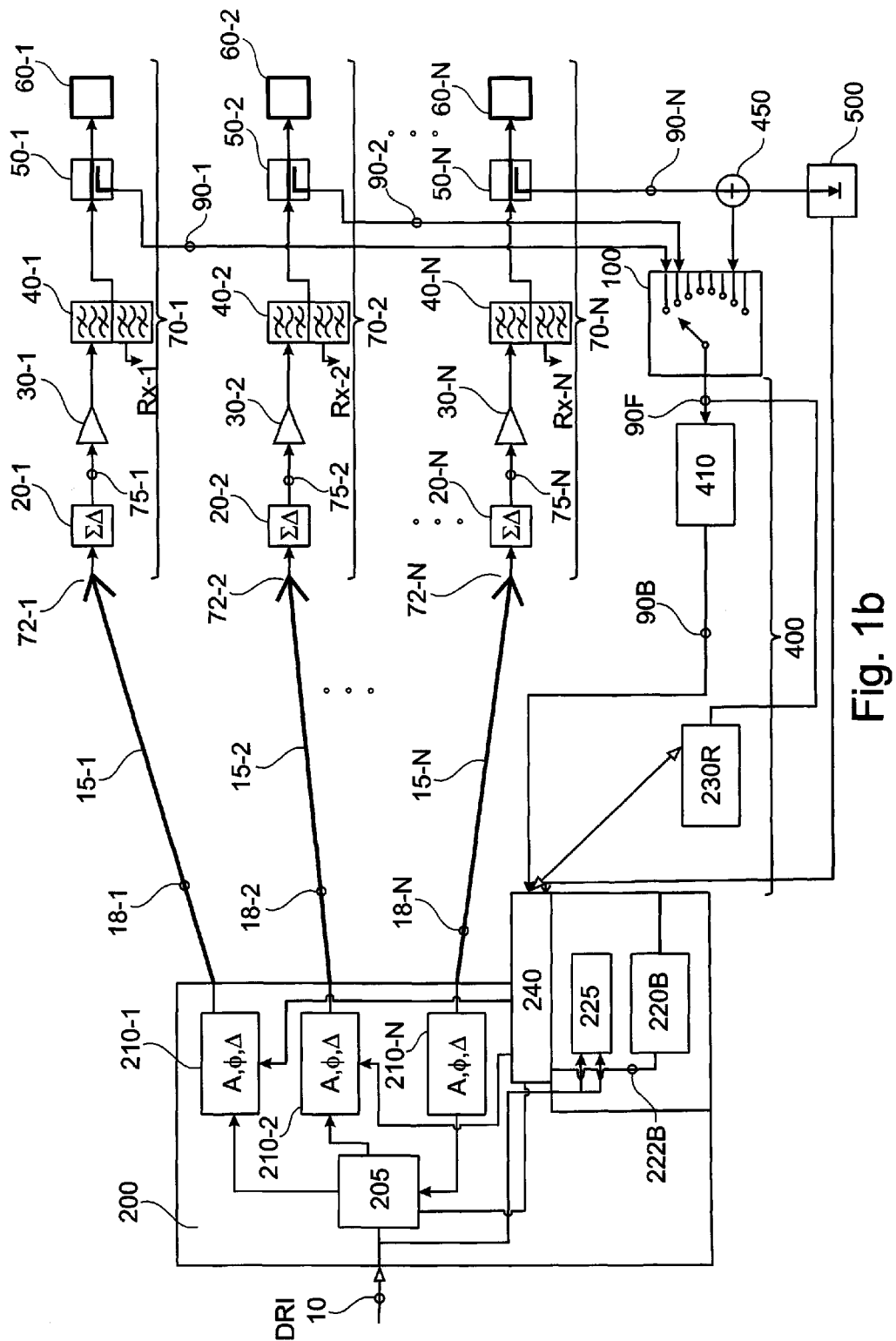
FIG. 1b shows a further aspect of the radio system.

FIG. 1b shows a further aspect of measuring the timing information for the base band calibration signal 90B travelling from the calibration signal modulator 410 to the calibration update module 240. In FIG. 1b the calibration signal modulator 230 (see FIG. 1a) is replaced by a receiver 230R. The base band calibration signal 222B or the payload signal 10 may be used as a calibration signal travelling along the links 15-1, 15-2, ..., 15-N and the transmit paths 70-1, ..., 70-N, 70-2, ..., 70-N reaching the switch 100. The receiver 230 is connected to the output of the switch 100 in order to measure the feedback signal 90F. A comparison of the feedback signal 90F received at the receiver 230R with the base band feedback signal 90B in the digital domain, received at the calibration update module 240, allows a determination of the timing information, i.e. the transit time, for the base band calibration signal 90B travelling from the feedback signal demodulator 410 to the calibration update module 240. Using the receiver 230R, as depicted in FIG. 1b, may be of advantage as there is no longer a transmitting element, such as the calibration signal modulator 230 (see FIG. 1a) involved in the calibration of the timing information. The transmitting elements are prone to cause unwanted interference that may eventually be radiated by the antenna array 1. This possible interference is prevented by the aspect shown in FIG. 1b.

Figure 1C:
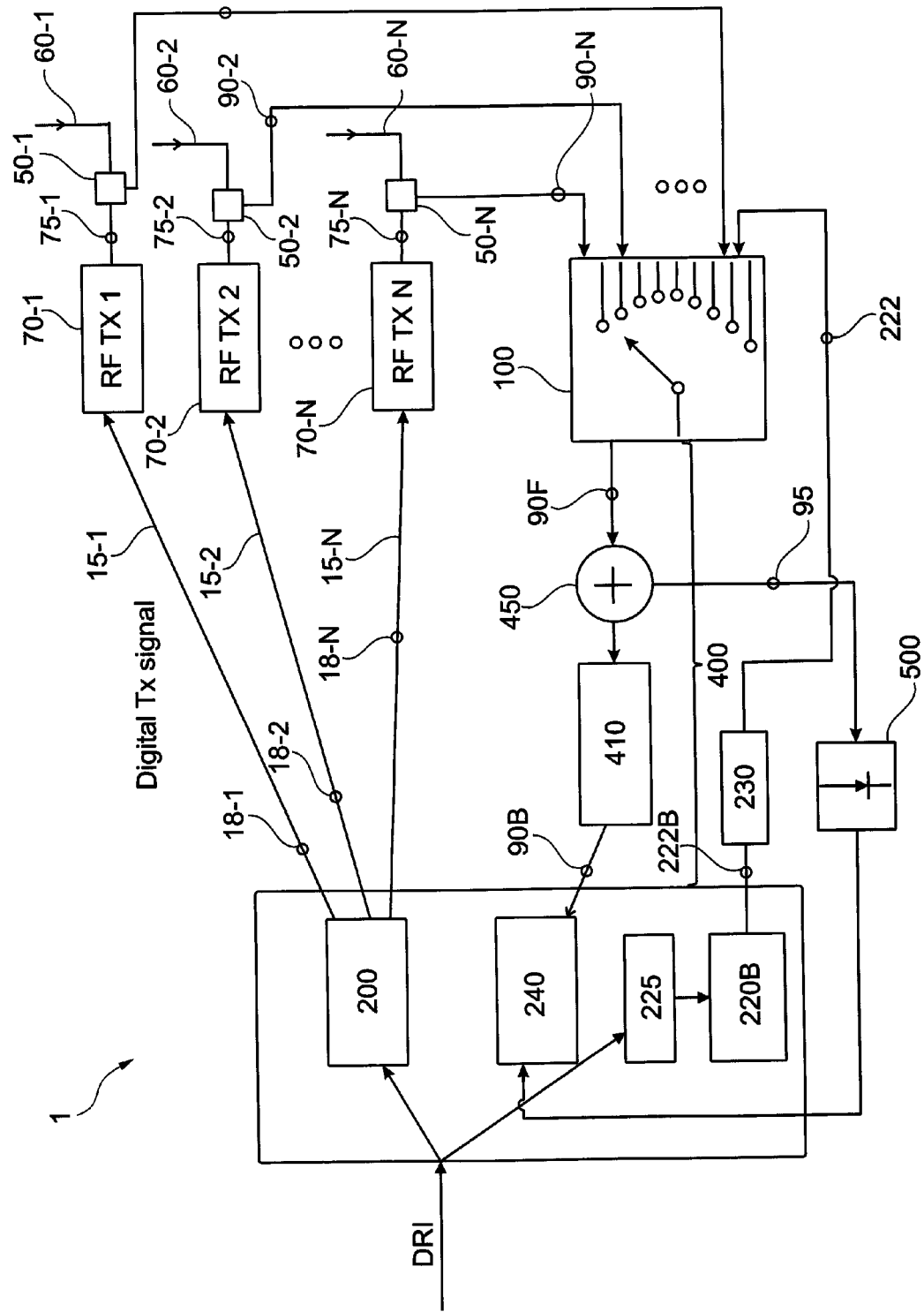
FIG. 1c shows another aspect of the radio system.
Figure 1D:
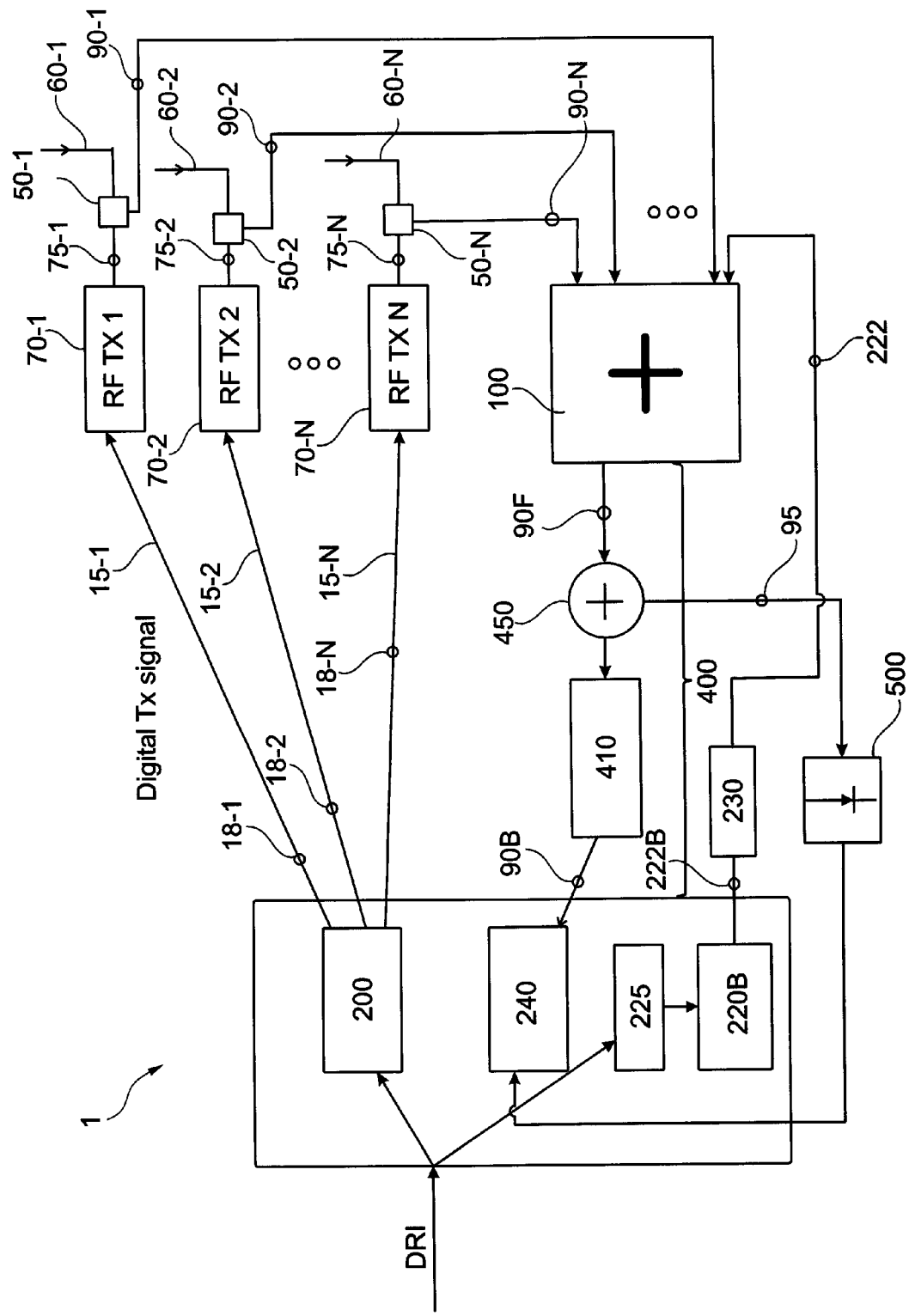
FIG. 1d shows yet another aspect of the radio system.

It is to be understood that in FIG. 1b the switch 100 may be replaced by the combiner 110 (see FIG. 1d). Furthermore it is sufficient to use an individual one of the transmit paths 70-1, ..., 70-N for calibrating the timing information for the base band calibration signal 90B leaving the calibration signal demodulator 410. Any variance in the transmit deviations 90T accumulated along the remaining ones of the transmit paths 70-1, ..., 70-N may be derived relative to the transmit deviations 90T measured along the individual one of the transmit paths 70-1, ..., 70-N, once the timing information for the base band calibration signal 90B has been determined It may be of interest to switch off the remaining ones of the transmit paths 70-1, ..., 70-N when calibrating the timing information for the base band calibration signal 90B using the individual one of the transmit paths 70-1, ..., 70-N in case the switch 100 was replaced by the combiner 110. The switching off of the remaining ones of the transmit paths 70-1, ..., 70-N may, for example, be achieved by switching off the amplifiers 40-1, 40-2, ..., 40-N of the remaining ones of the transmit paths 70-1, ..., 70-N. It is further to be understood that the aspect of the radio system 1 shown in FIG. 1b may without any limitation be combined with any other aspects of the radio system as disclosed herein.

It is possible to measure the timing deviations accumulated between the base band calibration signal generator 220B via the calibration signal modulator 230, the switch 100, the feedback signal demodulator 410 and the calibration signal update module 240 using one of the measurement methods as explained above. It is to be noted that the base band feedback signal 90B leaving the feedback signal demodulator 410 comprises a packetized signal in synchronisation with the synchronisation unit 225. In other words the base band feedback signal 90B is in synchronisation with the packetized payload signal 10 and therefore allows the calibration not only of the timing information of the base band calibration signal 90B but also of the phase, amplitude and delay changes 210-1, 210-2, 210-N. The present disclosure teaches the calibration of the phase, amplitude and delay changes 210-1, 210-2, 210-N applied to the packetized payload signal 10.

As explained above, the synchronisation module 225 provides a defined temporal relation between the packetized payload signal 10 and the packetized base band calibration signal 90B. Therefore the feedback signals 90F and the base band feedback signal 90B are in synch with the packetized payload signal 10.

In FIG. 1a a splitter 450 is provided in order to extract a selected one of the coupled transmit signals 90-1, 90-2, ... 90-N. The selected one of the coupled transmit signals 90-1, 90-2, ..., 90-N is the coupled transmit signal 90-N in FIG. 1a. Without any limitation any other one of the coupled transmit signals 90-1, 90-2, ... 90-N may be the selected one of the coupled transmit signals 90-1, 90-2, ... 90-N. The splitter 450 is adapted to extract a portion 95 out of the selected one of the coupled transmit signals 90-1, 90-2, ... 90-N. The portion 95 of the selected one of the coupled transmit signals 90-1, 90-2, ... 90-N is forwarded to a power sensor or power detector 500. Without any limitation the splitter 450 may comprise attenuating capability so that the portion 95 of the selected one of the coupled transmit signals 90-1, 90-2, ... 90-N is attenuated when leaving the splitter 450.

For the power measurement and calibrating as described further below the calibration unit 200 and/or the calibration update unit 240 would need to know any attenuating properties of the splitter 450. The power detector 500 may be implemented as a diode or any other suitable RF detector. The power detector 500 allows the measurement of a transmit power level relayed by the transmit paths 70-1, 70-2, ... 0.70-N pertaining to the selected coupled transmit signal 90-1, 90-2, ... 90-N.

It is to be understood that the power detector 500 also allows the monitoring and measuring of the transmit power levels of the transmit paths 70-1, 70-2, ... 70-N not pertaining to the selected coupled transmit signal 90-1, 90-2, ..., 90-N. More precisely the power detector 500 allows a measuring of a transmit power level ratio between the transmit paths 70-1, 70-2, ... 0.70-N.

When measuring the transmit power level ratio between the transmit paths 70-1, 70-2, ... 70-N the calibration unit 200 and/or the calibration update module 240 may use a transmit power level deduced from either the feedback signal 90F reaching the feedback signal demodulator 410 and/or a transmit power level deduced from the base band feedback signal 90B. Gain and attenuating properties of the transmit paths 70-1, ..., 70-N, the couplers 50-1, 50-2, ..., 50-N, the switch 100, the splitter 450, and the feedback signal demodulator 410 need to be substantially known when determining transmit power levels based on the feedback signal 90F and/or the base band feedback signal 90B.

It is convenient to use the transmit signals 75-1, 75-2, ..., 75-N for the power measurement and the power calibrating. Without any limitation dedicated power calibration signals may be used as well for the power calibrating. It will be appreciated by a person skilled in the art that any gain and/or attenuating characteristics of the splitter 450 and/or the power sensor 500 are not present for the coupled transmit signals 90-1, 90-2, ..., 90-N travelling directly from the couplers 50-1, 50-2, ..., 50-N to the switch 100. It is the provision of the power sensor 500 that allows a direct measurement of the portion 95 of the selected one of the coupled transmit signals 90-1, 90-2, ..., 90-N. The direct measurement of the transmit power can then be used to "calibrate" the power levels deduced at the feedback demodulator 410 and/or the calibration unit 200.

The transmit power level ratios determined using either the feedback signal demodulator 410 and/or the calibration unit 200 can be "calibrated" from the direct measurement using the power sensor 500.

It will be appreciated by a person skilled in the art that the feedback signal demodulator 410 and/or the calibration unit 200 is adapted to change power outputs and/or gain values of the amplifiers 30-1, 30-2, ..., 30-N within the transmit paths 70-1, 70-2, ..., 70-N. The control lines for setting the gain values of the amplifiers 30-1, 30-2, ..., 30-N are not shown in the drawings in order to improve a clarity of the drawings.

FIG. 1c shows a further aspect of the radio system 1. It is to be understood that within FIG. 1c the transmit paths 70-1, 70-2, ..., 70-N are shown as individual items. The transmit paths 70-1, 70-2, ..., 70-N as shown in FIG. 1c correspond to those discussed with respect to FIG. 1a. Within FIG. 1b the splitter 450 was moved from a position upstream of the switch 100 to a position downstream of the switch 100. Therefore the splitter 450 extracts a portion 95 of the feedback signal 90F as implemented in FIG. 1c. The feedback signal 90F is an analogue signal and therefore the same analogue splitter 450 may be used as in FIG. 1a or 1b. Providing the splitter 450 downstream of the switch 100 will allow the measurement of the portion 95 of the selected one of the coupled transmit signals 90-1, 90-2, ..., 90-N for each one of the coupled transmit signals 90-1, 90-2, ..., 90-N. As before all of the attenuating characteristics of the couplers 50-1, 50-2, ..., 50-N and the switch 100 substantially need to be known. More precisely one would need to know any attenuating properties of the switch 100. For the switch 100 it may well be that attenuating properties vary between individual ones of the settings of the switch 100. As stated before using a signal of known transmit power level would allow the measurement of the different attenuations for the individual switch settings of the switch 100. Such a signal could, for example, be provided during the manufacture of the radio system 1, specifically to allow this calibration to take place. With the arrangement of the splitter 450 as shown in FIG. 1c the measurement of the relative transmit power levels of the transmit paths 70-1, 70-2, ..., 70-N may be simplified compared to the setup of FIG. 1a or 1b.

FIG. 1d shows a variant of the radio system as explained with respect to FIG. 1a, 1b and 1c. In FIG. 1d the switch 100 has been replaced by a combiner 110. For the calibration of the phase, amplitude and delay changes 210-1, 210-2, ..., 210-N (see FIG. 1a) the provision of the combiner 110 is of interest in order to forward a combination of the coupled transmit signals 90-1, 90-2, ..., 90-N and the calibration signal 222 as the feedback signal 90F. The combiner 110 is known in the art and will not be explained in detail. The combiner 110 adds the coupled transmit signals 90-1, 90-2, ..., 90-N and the calibration signal 222 with a well defined phase relation between individual ones of the coupled transmit signal 90-1, 90-2, ..., 90-N and the calibration signal 222. Therefore the combiner 110 may provide a suitable representation of all the coupled transmit signals 90-1, ..., 90-N, 90-2, ..., 90-N and the calibration signal 222. As already shown in FIG. 1a, the calibration signal 222 is also provided to the combiner 110. Therefore the feedback signal 90F comprises the defined temporal relation present in the packetized payload signal 10. A relative phase angle added between the individual coupled transmit signals 90-1, 90-2, ..., 90-N and the calibration signal 222 has to be chosen very carefully, in order to prevent pairs of the coupled transmit signals 90-1, 90-2, ..., 90-N and the calibration signal 222 from destructive interference with each other, which would prevent the pair of the coupled transmit signal 90-1, 90-2, ..., 90-N and the calibration signal 222 from being represented within the feedback signal 90F. Implementing the combiner 110 as shown in FIG. 1d may be somewhat difficult with respect to accessing all individual ones of the coupled transmit signals 90-1, 90-2, ..., 90-N. It may be of interest to provide suppressors (not shown) for suppressing a selected one of the coupled transmit signals 90-1, ..., 90-N, in particular with the power sensor 500 disposed downstream of the combiner 110. Alternatively, as mentioned before, it is possible to switch off the remaining ones of the transmit paths 70-1, ..., 70-N in order to isolate the individual one of the transmit paths 70-1, ..., 70-N when using the combiner 110.

Figure 1E:
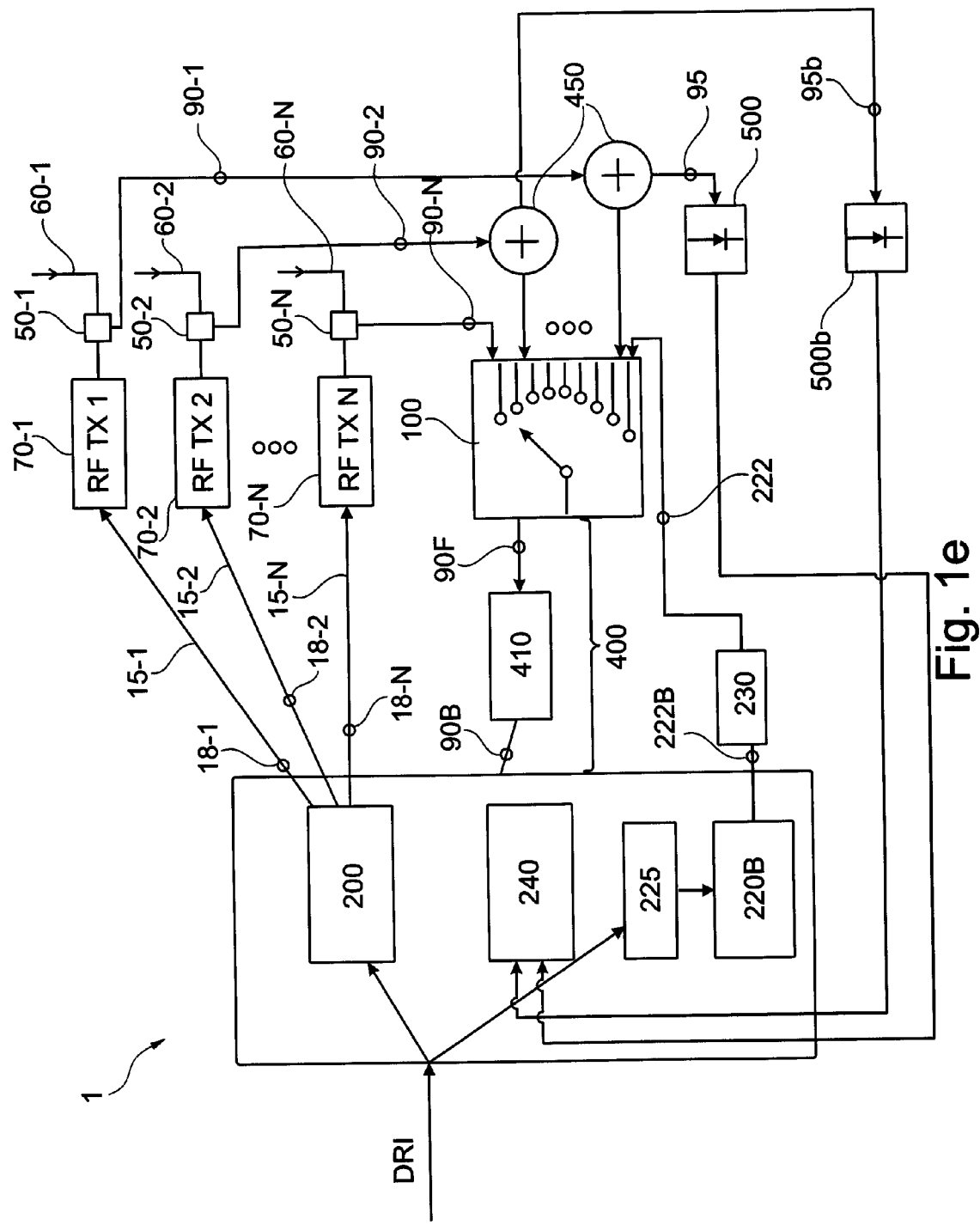
FIG. 1e shows yet a further aspect of the radio system.

FIG. 1e shows yet another aspect of the radio system 1. It may be of interest to provide a second splitter 450 in order to extract a second portion 95b of a second selected one of the coupled transmit signals 90-1, 90-2, ..., 90-N. The second portion 95b of the coupled transmit signals 90-1, 90-2, ..., 90-N is forwarded to a second power sensor 500b. Providing the power sensor 500 and the second power sensor 500b allows monitoring a state of health of the radio system 1. In particular the providing of the second power sensor 500b will introduce a redundancy into the power calibrating provided with the radio system 1.

It will be appreciated by a person skilled in the art that two power sensors 500, 500b may also be arranged such that the first power sensor 500 is arranged upstream of the switch 100 or the combiner 110 and the second power sensor 500b is arranged downstream of the switch 100 or the combiner 110 (as shown in FIG. 1d). Such an arrangement would allow for directly measuring attenuating properties of the switch 100 or the combiner 110 in one of the switching positions of the switch 100.

A position of the switch 100 is controlled by the calibration unit 200 and/or the feedback demodulator 410. In other words the calibration unit 200 and/or the feedback demodulator 410 know which one of the coupled transmit signals 90-1, 90-2, ..., 90-N and the calibration signal 222 is forwarded to the feedback signal demodulator 410 as the feedback signal 90F.

Figure 2:
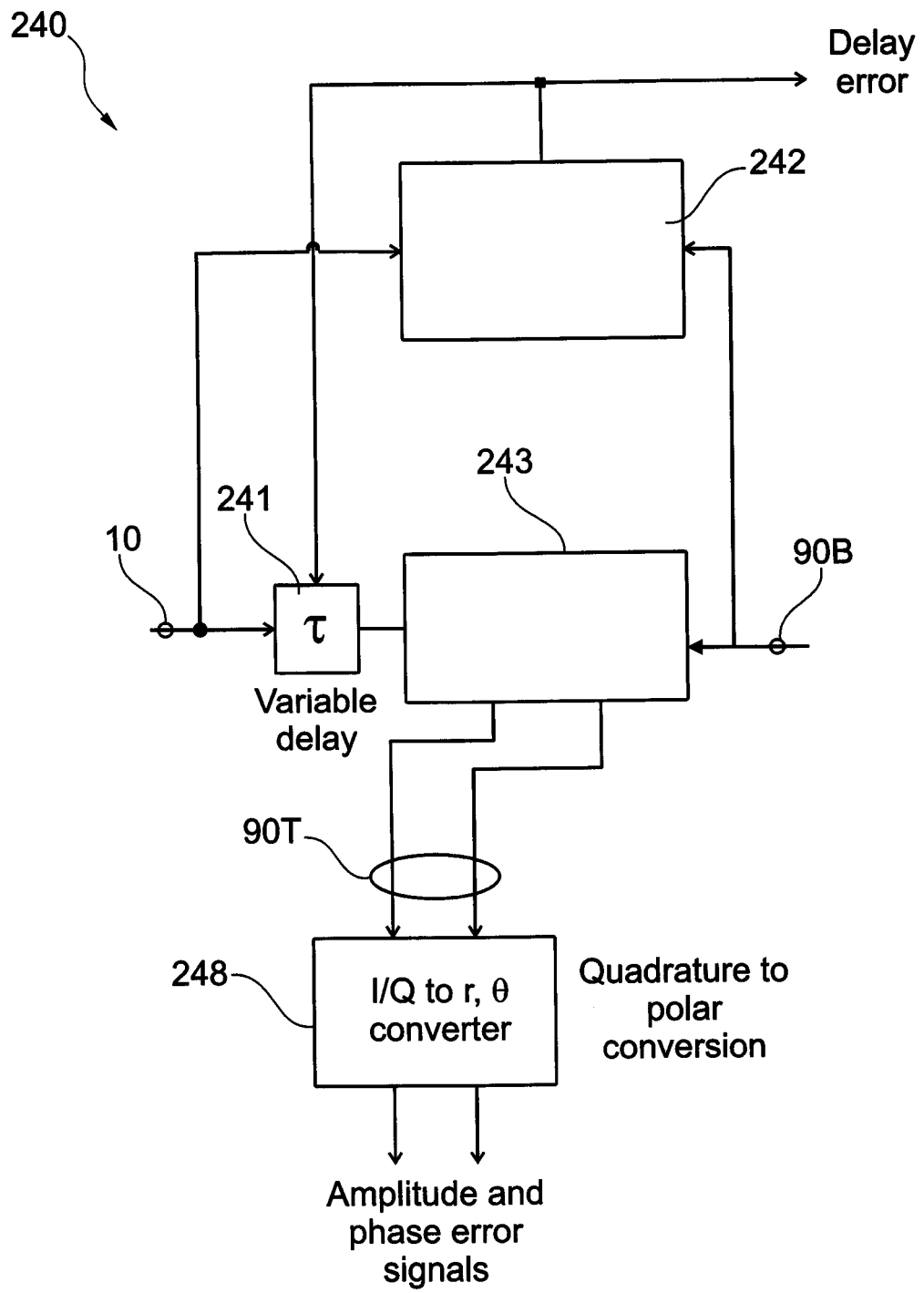
FIG. 2 shows a detailed view of a calibration update module.

FIG. 2 shows the calibration update unit 240 of the radio system 1 in more detail. The packetized payload signal 10 is provided to the calibration update unit 240 and a variable delay 241 is added to the packetized payload signal 10. The delay estimator 242 is adapted to estimate a delay between the packetized payload signal 10 and the transmit signals 75-1, 75-2, ..., 75-N being relayed by the radio system 1. The delay estimator 242 may be a bitwise delay estimator, but is not limited thereto. The delay estimator 242 may be of a higher precision than the a bitwise delay estimator. The delay estimated by the delay estimator 242 provides a measure for the transit time needed for the packetized payload signal 10 reaching the digital radio interface until a corresponding transmit signal 75-1, ..., 75-N is being relayed by the antenna elements 60-1, 60-2, ..., 60-N. It is to be understood that the radio system provides a measurement of the transit time. The delay estimator 242 is further used in order to give a first estimate of the variable time delay 241 that needs to be added to the packetized payload signal 10 before correlating the in phase component I and the quadrature component Q of the (delayed) packetized payload signal 10 with the feedback signal.

A correlator 243 is provided for the correlating of the in phase component I and the quadrature component Q of the (delayed) packetized payload signal 10 with the feedback signal. The correlator 243 as depicted is adapted to carry out the correlation of complex signals. It is possible to provide a first correlator and a second correlator, each of which is correlating one of the in phase component I and the quadrature component Q of the complex signals. As mentioned previously the complex signals are may be represented in any other form than the in phase component I and the out of phase component Q.

Most conveniently the correlation is carried out using the base band feedback signal 90B downstream of the calibration signal demodulator 410 (see FIGS. 1a-1e). It would be possible as well to carry out the correlating at the intermediate frequency. Using the intermediate frequency would require both the feedback signal and the (delayed) payload signal 10 to be provided at the intermediate frequency or to be suitably up-converted or down-converted to the intermediate frequency, as required.

The calibration update unit 240 further comprises a converter module 248. The converter module 248 converts the transmit deviation 90T provided in an in phase I and a quadrature Q format into the transmit deviations 90T in a polar format comprising a phase deviation and an amplitude deviation. Without any limitation the transmit deviations 90T may be provided in any other suitable format for representing an RF signal, for example, in a Cartesian format. The transmit deviations 90T provide the phase and the amplitude deviation that is accumulated along the transmit paths 70-1, 70-2, ..., 70-N and the feedback path 400 of the radio system 1.

Typically, the radio system 1 is connected to one or more antenna elements 60-1, 60-2, ..., 60-N such that a defined phase and amplitude relation between individual ones of the transmit paths 70-1, 70-2, ..., 70-N can be provided. The defined phase and amplitude relation between the individual ones of the transmit paths 70-1, 70-2, ..., 70-N is required for techniques such as beam forming, beam tilting, as is known in the art. Delay times are required for location based techniques, as known in the art. The radio system 1 is adapted to carry out these techniques. The transmit deviations 90T determined by the calibration update module 240 serve as a basis to apply phase, amplitude and delay changes 210-1, 210-2, ..., 210-N to yield the defined phase and amplitude relation between the individual ones of the transmit paths 70-1, 70-2, ..., 70-N.

It is to be understood that the provision of the base band calibration signal generator 222B will provide the feedback signal 90F and the base band feedback signal 90B in synchronisation with the packetized payload signal 10 as is required for the calibration of the phase, amplitude and delay changes 210-1, 210-2, ..., 210-N.

It is to be noted that the transmit deviations 90T may need to be corrected for a portion of the transmit deviations 90T pertaining to the coupled transmit signals 90-1, ..., 90-N travelling from the couplers 50-1, 50-2, ..., 50-N to the switch 100, along the transmit path 400 reaching the calibration update unit 240. Clearly the design of the radio system 1 will allow estimating the portion of the transmit deviations 90T not pertaining to the relaying of the transmit signals 75-1, ..., 75-N being relayed along the transmit paths 70-1, 70-2, ..., 70-N.

Figure 3A:
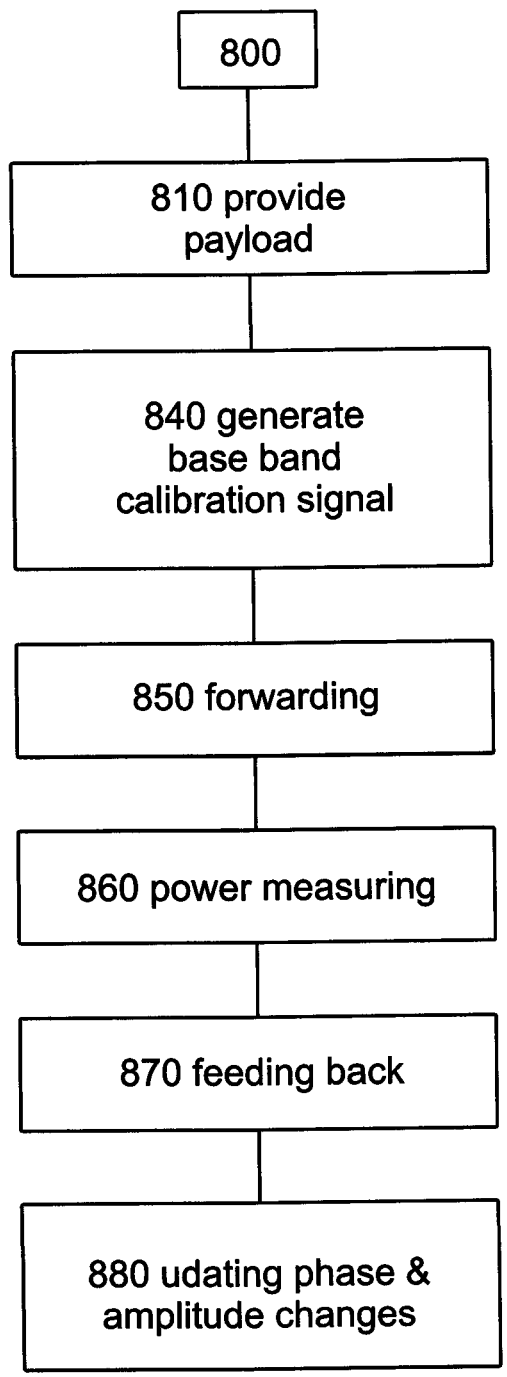
FIG. 3a shows a flow chart of the method for relaying packetized radio signals.

The present disclosure further teaches a method 800 for relaying radio packetized signals. FIG. 3a shows a flow chart of the method 800.

In a step 810 the packetized payload signal 10 is provided. The packetized payload signal 10 may, for example, comprise the in-phase component I and the quadrature component Q as pairs (I, Q), as is known in the art. The packetized payload signal 10 may, for example, be provided at a digital radio interface DRI, as explained above.

In a step 840 the base band calibration signal 222B is generated. Properties of the base band calibration signal 222B will be reflected in the calibration signal 222 generated by the calibration modulator 230. The generating 840 of the based band calibration signal 222B is known in the art. A step 850 comprises forwarding the calibrated payload signal 18-1, 18-2, ..., 18-N as a transmit signal 75-1, 75-2, ..., 75-N. A step 860 comprises a power measuring of a power level of the portion of the selected one of the coupled transmit signals 90-1, ..., 90-N. of A step 870 provides a feeding back of a selected one of the coupled transmit signals 90-1, 90-2, ..., 90-N as the feedback signal 90F. The step 880 comprises an updating of phase, amplitude and delay changes 210-1, 210-2, ..., 210-N. The updating 880 may be implemented in response to the feedback signal 90F in the feedback paths 400.

The base band calibration signal 222B will be of a vanishing mean value when combined with a digital predistortion. Methods of generating such a signal forming the calibration signal 222 and/or the base band calibration signal 222B are known in the art.

Figure 3B:
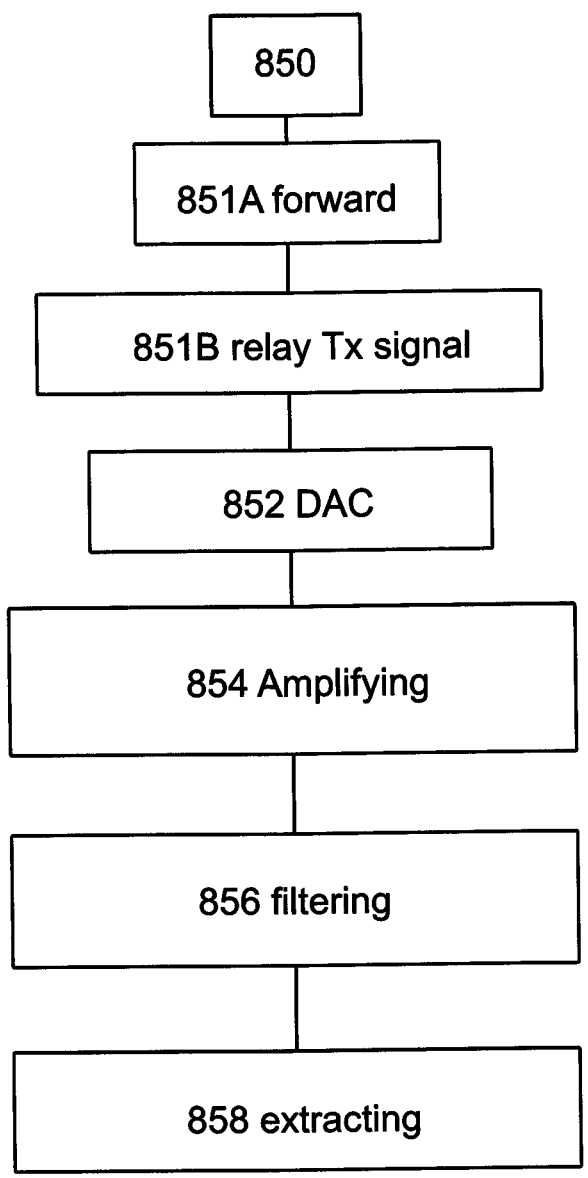
FIG. 3b shows a flow chart illustrating a step of forwarding a packetized payload signal.

FIG. 3b shows further details of the step 850 of forwarding the payload signal 10. A step 851A comprises forwarding a calibrated payload signal 18-1, 18-2, ..., 18-N along the links 15-1, 15-2, ..., 15-N. The calibrated payload signal 18-1, 18-2, ..., 18-N was generated in the step 851A by applying the phase, amplitude and delay changes 210-1, 210-2, ..., 210-N to the payload signal 10 after the payload signal 10 was split. In the step 851A the calibrated payload signals 18-1, 18-2, ..., 18-N are forwarded to the entry ports 72-1, 72-2, ..., 72-N of the transmit paths 70-1, 70-2, ..., 70-N. In a step 851B the calibrated payload signals 18-1, 18-2, ..., 18-N are relayed as a transmit signal 75-1, 75-2, ..., 75-N along the transmit paths 70-1, 70-2, ..., 70-N after reaching the entry ports 72-1, 72-2, ..., 72-N.

The step 850 further comprises a step 852 of digital to analogue converting the transmit signal 75-1, 75-2, ..., 75-N. The step 852 of digital to analogue converting may comprise using the sigma delta digital-to-analogue convertors 20-1, 20-2, ..., 20-N. It will be appreciated that the use of the sigma delta digital-to-analogue convertors does not require an up-converting step and a filtering step as is required with traditional digital-to-analogue converters.

In a step 854 the transmit signal 75-1, 75-2, ..., 75-N is amplified. The step 854 of amplifying may be carried out using the amplifier 30-1, 30-2, ..., 30-N. The step 850 comprises a step of filtering 856 the transmit signal 75-1, 75-2, ..., 75-N. The step of filtering 856 may as well comprise using duplex filters 40-1, 40-2, ..., 40-N. The use of the duplex filters 40-1, 40-2, ..., 40-N is of interest when dealing with the radio system 1 comprising transmit and receive functionalities. A step 858 comprises extracting a coupled transmit signal 90-1, 90-2, ..., 90-N from the transmit signals 75-1, 75-2, ..., 75-N.

Figure 3C:
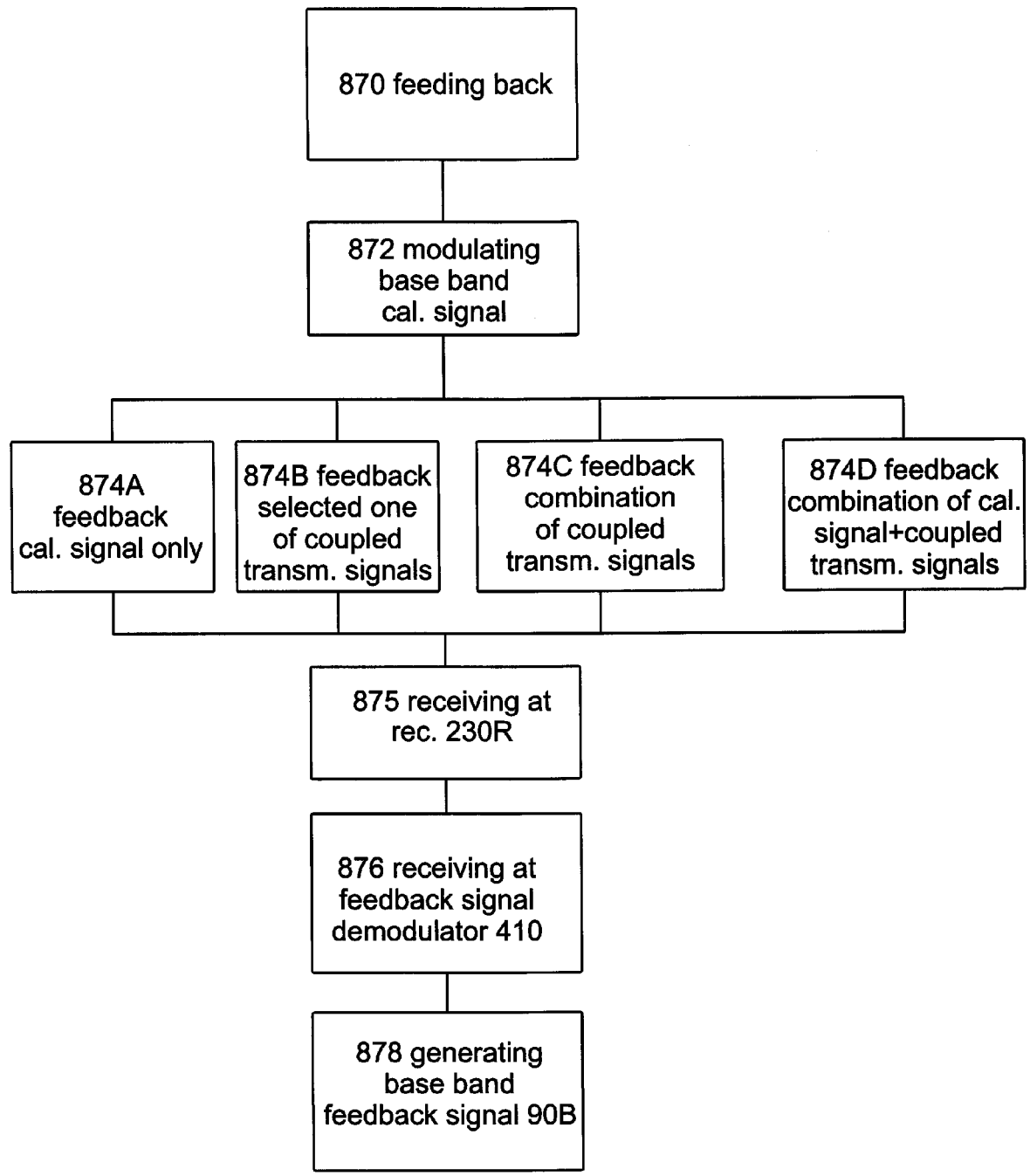
FIG. 3c shows a flow chart illustrating a step of feeding back a feedback signal.

FIG. 3c shows further details of the step 870 of feeding back the feedback signal 90F. The step 870 comprises a step 872 of modulating the base band calibration signal 222B. The modulating step 872 of modulating the base band calibration signal 222B yields a calibration signal 222. Subsequently the method provides four different alternatives branching out in four different steps of feeding back the feedback signal 90F. In a step 874A the calibration signal 222 is fed back only as a first alternative. The feedback 874A of the calibration signal 222 only may be of interest in order to calibrate the feedback path 400 as discussed above.

As a second alternative in a step 874B a selected one of the coupled transmit signals 90-1, 90-2, ..., 90-N is forwarded to the feedback path 400 as the feedback signal 90F. The step 864B may be of interest when using the radio system 1 incorporating the switch 100 as shown in FIGS. 1a, 1b, 1c and 1e.

A third option comprises a step 874C of feeding back a combination of coupled transmit signals 90-1, 90-2, ..., 90-N as the feedback signal 90F. The feedback step 874C of feeding back the combination of the coupled transmit signals 90-1, 90-2, ..., 90-N is of interest when the radio system 1 comprises the combiner 110 as discussed with respect to FIG. 1d.

According to a fourth option in a step 874D a combination of the calibration signal 222 and a combination of coupled transmit signals 90-1, 90-2, ..., 90-N is forwarded as the feedback signal 90F. The step 874D is of interest in combination with the radio system 1 as shown in FIG. 1d.

Subsequently to the steps 874A, 874B, 874C and 874D an optional step 875 of receiving a feedback signal at the receiver 230R (see FIG. 1b) may be carried out. The feedback signal may be formed according to any one of the steps 874A, 874B, 874C or 874D. The step 875 of receiving the feedback signal at the receiver 230R may be of interest in order to avoid the base band calibration signal generator 220B if carried out after the step 874B or 874C.

The steps 874A, 874B, 874C, 874D or the optional step 875 of receiving the feedback signal are followed by a common step 876 of receiving the feedback signal 90F at the feedback signal demodulator 410. In a step 878 the base band feedback signal 90B is generated.

Figure 3D:
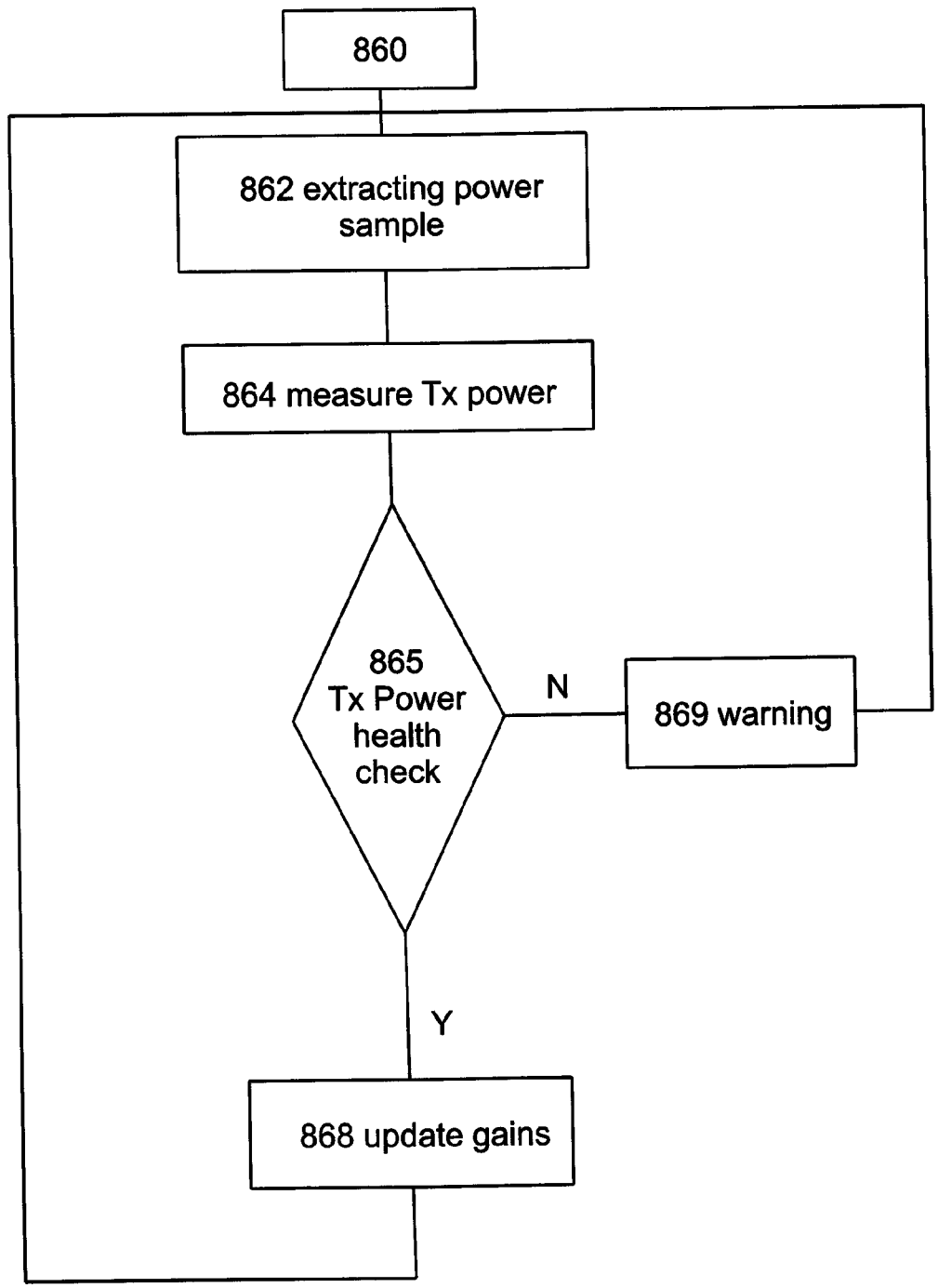
FIG. 3d shows a flow chart illustrating a step of measuring a transmit power level.

FIG. 3d shows details of the step of power measuring 860. The step of power measuring 860 comprises a step 862 of extracting the portion 95 of the selected coupled transmit signal 90-1, 90-2, ..., 90-N. The step 862 may be implemented using the splitter 450 and/or the second splitter 450b. The step 860 of power measuring further comprises a step 864 of measuring a transmit power level. The transmit power level may be measured in the step 864 using the power sensor 500 or the second power sensor 500b as described with respect to FIGS. 1a to 1e. A step 865 comprises a "health check" of the transmit power. In response to the measured transmit power in the step 864 it is determined whether the measured transmit power indicates a healthy state of operation of the radio system 1. The radio system 1 may know power levels needed in order to correctly achieve the beam forming techniques as described above. In case the health check in the step 865 of the transmit power levels does not reflect a healthy state of operation a warning may be issued in a step 869. It is to be understood that the step 865 of the health check of the transmit power does not only cover the transmit power levels measured using the power sensor 500 and the second power sensor 500b. Furthermore the health check in the step 865 comprises checking the relative transmit power levels as explained above. In the case that the health check of the step 865 is positive a step 868 of updating gain values of the transmit paths 70-1, 70-2, ..., 70-N is carried out in response to the checking in the step 865. After the step 868 the method returns to the step 862. Likewise the method returns to the step 862 after the step 869.

It is to be understood that with the step 868 of updating the gain values of the transmit paths 70-1, 70-2, ..., 70-N a power calibrating of the transmit power levels is achievable. The calibrating of the relative transmit power levels is also achievable in the step 868a of updating the gain values of the transmit paths 70-1, 70-2, ..., 70-N.

Figure 3E:
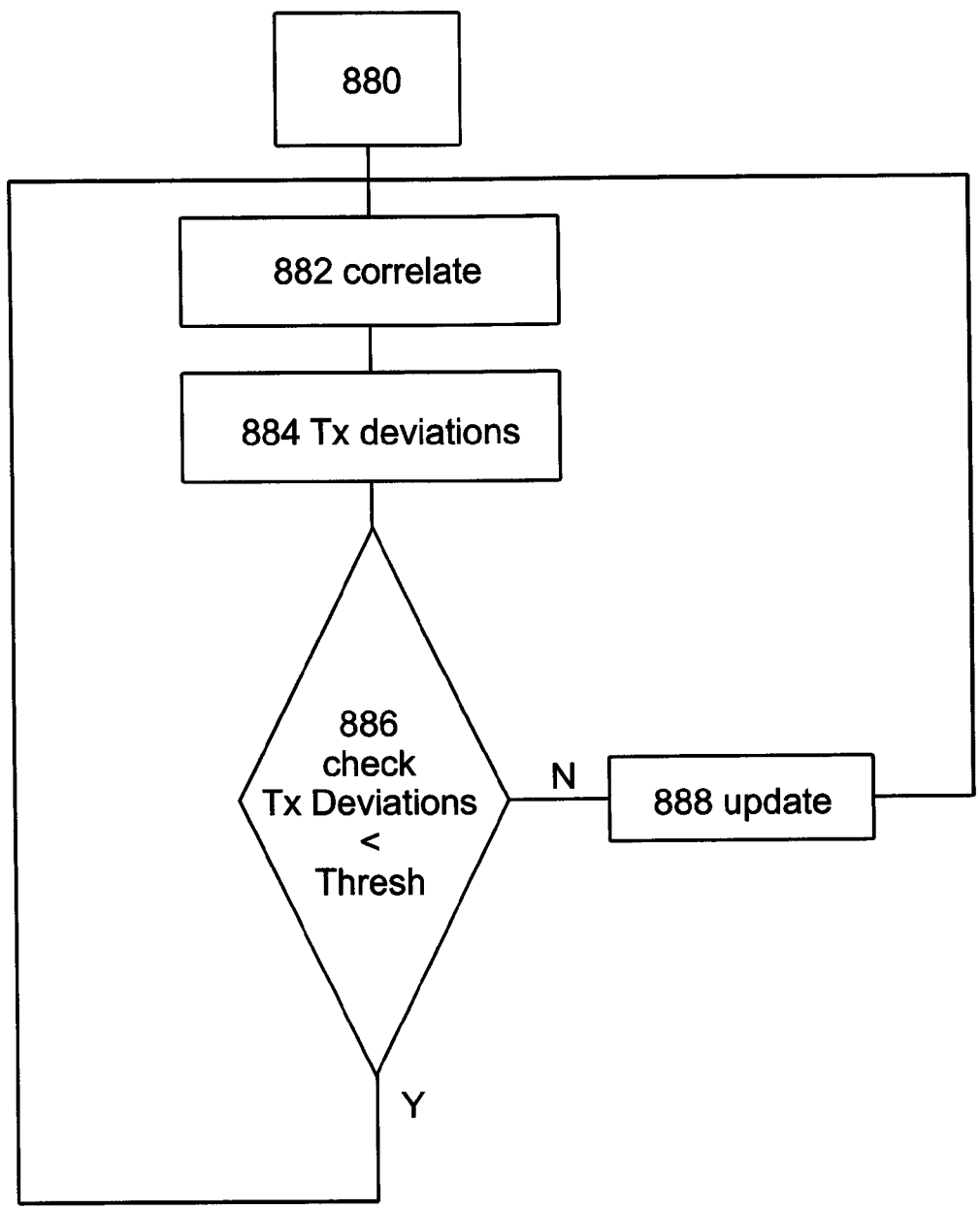
FIG. 3e shows a flow chart illustrating a step of updating the phase, amplitude and delay changes.

FIG. 3e shows a diagram describing details of the step 880 of updating the phase, amplitude and delay changes 210-1, 210-2, ..., 210-N. A step 882 comprises correlating the packetized payload signal 10 and the base band feedback signal 90B. As stated before the correlating may comprise correlating the base band calibration signal 222B to the base band calibration signal 222B comprised within base band feedback signal 90B. It is to be understood that the feedback signal 90F, the base band feedback signal 90B and the packetized payload signal 10 are synchronised by the synchronisation unit 225. In a step 884 the transmit deviations 90T are derived from the signals correlated in the step 882. It is to be understood that the transmit deviations 90T may comprise transit times needed for the payload signal 10 entering the DRI until a corresponding transmit signal 75-1, ..., 75-N is being relayed by the radio system 1. In a step 886 it is checked if the transmit deviations 90T are below a predefined threshold. In case the transmit deviations 90T are below the predefined threshold the method 800 returns to the step 882. In case the transmit deviations 90T are not below the predefined threshold in a step 888 an updating of the phase, amplitude and delay changes 210-1, 210-2, ..., 210-N is carried out, responsive to the transmit deviations 90T derived in the step 886. The updating 888 of the phase, amplitude and delay changes 210-1, 210-2, ..., 210-N is well known in the art and shall not be discussed any further.

It is to be understood that the method 800 has been explained for the calibration of the phase, amplitude and delay changes 210-1, 210-2, ..., 210-N for an individual one of the transmit paths 70-1, 70-2 ..., 70-N with respect to the radio system 1. Only for the aspect of the radio system 1 as shown in FIG. 1c all the transmit paths 70-1, 70-2, ..., 70-N will be calibrated after a first iteration of the method 800 as described. For all other aspects of the radio system 1 several iterations of the method 800 as described will be required for all the transmit paths 70-1, 70-2, ..., 70-N to be calibrated.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A radio system for relaying packetized radio signals, the radio system comprising:
   a base band calibration signal generator configured to insert a base band calibration signal into a packetized payload signal, the base band calibration signal being synchronized to a synchronization unit;
   a calibration unit configured to split the packetized payload signal, thus producing at least one calibrated payload signal, the calibration unit further configured to apply at least one of phase, amplitude and delay changes to the at least one calibrated payload signal;
   at least one link configured to forward the at least one calibrated payload signal to at least one transmit path; at least one transmit path configured to forward the calibrated payload signal as
   a transmit signal; a feedback path for feeding back a feedback signal;
   a calibration signal modulator configured to receive the said base band calibration signal from the said base band calibration signal generator and to provide a calibration signal to the feedback path;
   a feedback signal demodulator for receiving the feedback signal and for generating a demodulated base band feedback signal;
   wherein the at least one of phase, amplitude and delay changes are configurable using said base band feedback signal.

2. The radio system according to claim 1, wherein a transit time needed for the packetized payload signal from reaching the radio system until a corresponding transmit signal is being relayed by the radio system.

3. The radio system according to claim 1, wherein the at least one of phase, amplitude and delay changes are configured to use correlations of the packetized payload signal and the base band calibration signal.

4. The radio system according to claim 1, further comprising a calibration update module for updating the at least one of phase, amplitude and delay changes.

5. The radio system according to claim 4, wherein at least one of the following elements is implemented on a chip: the calibration unit, the base band calibration signal generator, the calibration signal modulator, and the synchronisation module.

6. The radio system according to claim 5 wherein the chip comprises a digital signal processor.

7. The radio system according to claim 1, wherein the calibration signal calibrates the feedback path.

8. The radio system according to claim 1, wherein a power output of the at least one transmit path is measurable in response to the transmit power of the portion of the first one of the coupled transmit signals.

9. The radio system according to claim 8, wherein the power output of the at least one transmit path is updateable in response to the transmit power of the portion of the first one of the coupled transmit signals.

10. The radio system according to claim 8, wherein the calibration unit is further configured to measure a transmit power ratio of the transmit paths.

11. The radio system according to claim 1, wherein the at least one transmit path is terminated by an antenna element.

12. The radio system according to claim 1, wherein the at least one transmit path further comprises a digital to analogue converter.

13. The radio system according to claim 12, wherein the digital to analogue comprises a sigma delta digital to analogue converter.

14. The radio system according to claim 1, wherein the at least one transmit path further comprises an amplifier for amplifying the transmit signal.

15. The radio system according to claim 1, wherein the at least one transmit path further comprises a filter filtering the transmit signal.

16. The radio system according to claim 15, wherein the filter comprises a duplex filter.

17. The radio system according to claim 1, further comprising a switch for forwarding a selected one of the calibration signal and the coupled transmit signal as the feedback signal into the feedback path.

18. The radio system according to claim 1, further comprising a combiner for combining the coupled transmit signals and the calibration signal as the feedback signal into the feedback path.

19. A method for relaying packetized radio signals, the method comprising:
providing a packetized payload signal;
generating a base band calibration signal configured to be inserted into the packetized payload signal, wherein the base band calibration signal is in synchronization with a synchronization unit;
generating a calibrated payload signal,
forwarding the calibrated payload signal as a transmit signal;
feeding back a portion of the transmit signal via a feedback path;
transforming the said base band calibration signal into a calibration signal; feeding back said calibration signal via said feedback path; demodulating the calibration signal received over the feedback path for generating a demodulated base band feedback signal;
calibrating the feedback path by using the calibration signal; and updating at least one of phase, amplitude and delay changes in response to the feedback signal.

20. The method according to claim 19, wherein the updating the at least one of phase, amplitude and delay changes comprises using correlation methods.

21. The method according to claim 20, wherein the forwarding of the packetized payload signal as a transmit signal along the at least one transmit path further comprises:
forwarding the calibrated payload signal along at least one link to at least one transmit path;
relaying the calibrated payload signal as a transmit signal along the at least one transmit path;
digital to analogue converting the transmit signal;
amplifying the transmit signal
filtering the transmit signal;
extracting a coupled transmit signal from the at least one transmit path.

22. The method according to claim 19, wherein the updating of the at least one of the phase, amplitude and delay changes comprises:
correlating the packetized payload and the base band feedback signal;
extracting transmit deviations;
checking whether the transmit deviations are above a threshold, and
updating the phase, amplitude and delay changes responsive to the checking.

23. The method according to claim 22, wherein the extracting of transmit deviations comprises:
extracting a transit time for a packetized payload signal.

24. Computer program product embodied on a non-transitory computer-readable medium and the computer-readable medium comprising executable instructions for the manufacture of the radio system for relaying packetized radio signals, the radio system comprising:
a base band calibration signal generator configured to insert a base band calibration signal into a packetized payload signal, the base band calibration signal being synchronized to a synchronization unit;
a calibration unit configured to split the packetized payload signal, thus producing at least one calibrated payload signal, the calibration unit further configured to apply at least one of phase, amplitude and delay changes to the at least one calibrated payload signal;
at least one link configured to forward the at least one calibrated payload signal to at least one transmit path;
at least one transmit path configured to forward the calibrated payload signal as a transmit signal;
a feedback path for feeding back a feedback signal;
a calibration signal modulator configured to receive the said base band calibration signal from the said base band calibration signal generator and to provide a calibration signal to the feedback path; a feedback signal demodulator for receiving the feedback signal and for generating a demodulated base band feedback signal;
calibrating the feedback path by using the demodulated base band feedback signal, and wherein the at least one of phase, amplitude and delay changes are configurable using said base band feedback signal.

25. Computer program product embodied on a non-transitory computer-readable medium and the computer-readable medium comprising executable instructions for the execution of a method for relaying packetized radio signals, the method comprising:
providing a packetized payload signal; generating a base band calibration signal configured to be inserted into the packetized payload signal, wherein the base band calibration signal is in synchronization with a synchronization unit;
generating a calibrated payload signal; forwarding the calibrated payload signal as a transmit signal;
feeding back a portion of the transmit signal via a feedback path; transforming the said base band calibration signal into a calibration signal; feeding back said calibration signal via said feedback path; demodulating the calibration signal received over the feedback path for generating a demodulated base band feedback signal;

calibrating the feedback path by using the demodulated base band feedback signal; and updating at least one of phase, amplitude and delay changes in response to the feedback signal.

\* \* \* \* \*